United States Patent [19]

Fauser et al.

[11] Patent Number: 4,517,057
[45] Date of Patent: May 14, 1985

[54] METHOD AND APPARATUS FOR SHORT-PATH DISTILLATION

[75] Inventors: Friedrich Fauser, Hammersbach; Willi Fischer, Seligenstadt, both of Fed. Rep. of Germany

[73] Assignee: Leybold-Heraeus GmbH, Cologne, Fed. Rep. of Germany

[21] Appl. No.: 385,236

[22] Filed: Jun. 4, 1982

[30] Foreign Application Priority Data

Jun. 6, 1981 [DE] Fed. Rep. of Germany ....... 3122652

[51] Int. Cl.³ ............................................. B01D 3/12
[52] U.S. Cl. .................................. 202/205; 202/236; 203/89
[58] Field of Search .................. 202/205, 236; 203/89, 203/91

[56] References Cited

U.S. PATENT DOCUMENTS 2,514,144  7/1950  Ferris et al. .......................... 202/236
3,020,211  2/1962  Smith .................................. 202/205
3,434,935  3/1969  Habendorff et al. .

Primary Examiner—Frank Sever
Attorney, Agent, or Firm—Felfe & Lynch

[57] ABSTRACT

In a method and apparatus for short-path, high-vacuum distillation from a liquid on plate-like evaporating surfaces from which distillable fractions evaporate and precipitate onto condensation surfaces a short distance away, the liquid is placed upon the evaporating surfaces at a temperature such that the energy required for its evaporation is taken, at least in part, from the still-unevaporated fraction of the liquid.

15 Claims, 5 Drawing Figures

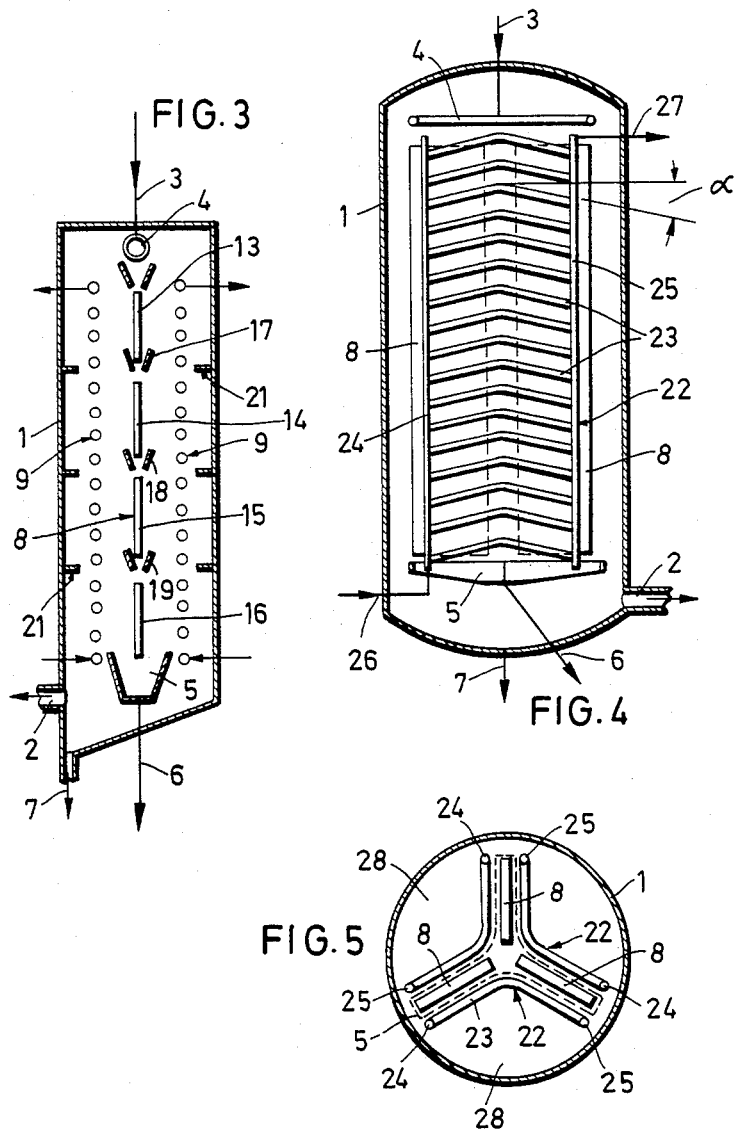

4,517,057

METHOD AND APPARATUS FOR SHORT-PATH DISTILLATION

The invention relates to a method and apparatus for short-path distillation from a liquid in a vacuum wherein the liquid is placed upon evaporating surfaces from which distillable fractions evaporate and condense onto condensation-surfaces a short distance away.

Short-path distillation is used for straight-out distillation of temperature-sensitive substances at low pressures. In it, vapors are transported, with no choke or throttling losses, from an evaporating surface to a condensation surface, the surfaces being arranged at a short distance from each other. A "short-path" with a maximal-flow cross section is thus available for the vapors. The liquid is applied to the evaporating surface in the form of a thin film (a trickle film, wiped film, falling film, or the like). This achieves a brief period of residence and gentler handling of the liquid. Known methods and apparatuses use heated evaporating surfaces to supply heat-energy. Use is made of heat-carrier heating (steam, heat-carrying oil) or radiation heating.

The disadvantages of these known methods and apparatuses is that they are technically complex and have relatively high production and operating costs. Unless the distribution of the product over the evaporating surfaces is extremely uniform at all times, the surfaces become constantly encrusted. These incrustations impair the further progress of the method and require costly cleaning processes to eliminate them. For this reason, short-path distillation has not been successful for distilling bulk-products, for example mineral oils.

It is therefore the purpose of the present invention to provide a short-path distillation method of the type mentioned at the beginning hereof, together with a substantially-simpler and less-costly apparatus for the execution of the said method.

According to the invention, the first part of this purpose is achieved in that a liquid is applied to an evaporating surface at a temperature such that the energy required for evaporation is taken at least partially, i.e. in whole, in part, or sectionally, from the still-unevaporated fraction of the liquid. The main advantage of this is that heat-transfer surfaces are no longer needed. The total energy-cost is thus lower than with evaporating surfaces heated from an outside source, and this has the advantage of reducing the size of the evaporating surfaces. Furthermore, eliminating outside heating for the evaporation surface eliminates the relevant installation costs, and incrustation no longer arises, even when the product is temporarily distributed unevenly over the evaporating surfaces. The accurate machining hitherto required for said evaporating surface, in order to ensure uniform distribution of the film, may therefore be sharply reduced.

In contrast to conventional short-path distillation, the temperature of the liquid being distilled decreases as it passes through the apparatus. In order to maintain a small temperature differential between the inlet and the outlet, it is desirable to circulate the liquid repeatedly over the evaporating surfaces in the form of a circuit, feed and residue removal being effected in partial flow. At the same time this narrows the boiling-range of the liquid.

It is also possible to associate with the decreasing temperature of the product from inlet to outlet a similarly-decreasing condensation surface temperatures and-/or a similarly-decreasing evaporation pressures. To this end, for example, a flow of coolant may be directed in counterflow to the liquid. It is, of course, also possible to provide a plurality of separate cooling circuits operating at different temperatures. In order to obtain different pressures, throttle elements may be provided in a vacuum container for the distillation, or the vacuum container may have several connections for pumps with varying suction capacities. Different pressures may also be achieved with different cross-sectional configurations of the vacuum vessel.

It may also be advantageous to provide for a portion of the evaporating surfaces—preferably that located in the vicinity of the residue removal—to be heatable, the hearing medium used being preferably the liquid itself, if it is sufficiently hot before it is introduced.

An advantageous apparatus for the method according to the invention is characterized by evaporation surfaces which are in whole, in part or sectionally not heated from an outside source, i.e. in that the heat energy from the still-unevaporated fraction of the liquid is taken. Apparatuses of this kind are particularly satisfactory for distilling liquids having a small specific heat of evaporation and relatively high enthalpy, as in the case of many high-molecular-weight substances. In the case of mineral oil, for example, 50% of the liquid may be evaporated from the enthalpy of the liquid, if the inlet temperature is 60K above the residue or outlet temperature.

It is therefore particularly advantageous to use the method according to the invention, and a short-path distillation apparatus according to the invention, for mineral-oil distillation, as a distilling step following the usual distillation under vacuum. The residue from the preceding, usual distillation is already at a sufficiently-high temperature (about 360°), so that the subsequent short-path distillation step may be carried out without the use of any additional energy.

Additional advantages and details of the invention are explained hereinafter in conjunction with the exemplary embodiments illustrated diagrammatically in the drawings attached hereto in which:

FIG. 3 is a diagrammatic, sectional elevation of a third embodiment;

FIG. 4 is a diagrammatic, sectional elevation of a further embodiment; and

FIG. 5 is a plan, sectional view of the embodiment shown in FIG. 4.

Figure 1:
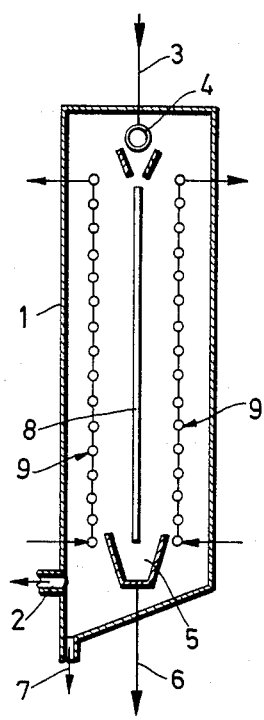
FIG. 1 is a diagrammatic, sectional elevation of a first embodiment.

In all of the figures, the components bear the following reference numerals:

1—vacuum container;
2—a connection for an evacuating unit;
3—a supply line;
4—a device for distributing liquid on evaporating surfaces;
5—a residue collector;
6—a residue drain line;
7—a distillate outlet.

In the embodiment according to FIG. 1, a simple drain or trickle plate constitutes the evaporating surfaces 8, condensation surfaces 9 being arranged at a short distance from them and consisting of a pipe coil through which a coolant flows from bottom to top. This produces a reduction in the temperature of the condensation surfaces from top to bottom, i.e. from the product inlet to the outlet, corresponding to a similar reduction in the temperature of the liquid.

Figure 2:
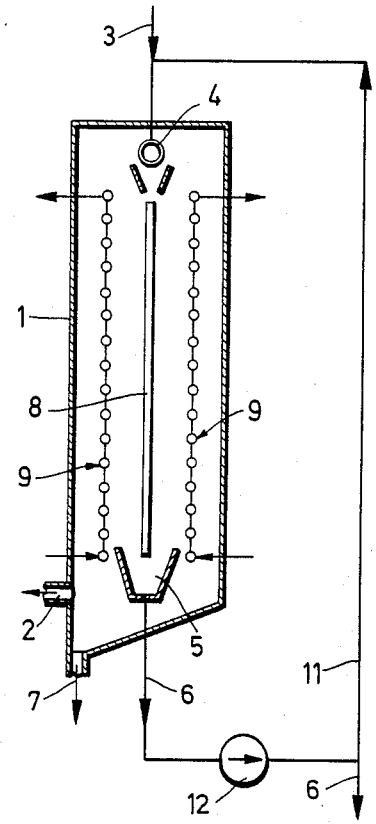
FIG. 2 is a diagrammatic, sectional elevation of a second embodiment.

The design of the distilling unit according to FIG. 2 is identical with that in FIG. 1, but the product is applied repeatedly to the evaporating surfaces by circulation line 11 and feed pump 12. Feed line 3 opens into circulation line 11. Part of the residue from drain line 6 also runs through circulation line 11 so that feed and residue removal are effected in part flows.

In the embodiment according to FIG. 3, evaporating surfaces 8 consist of four drain plates 13 to 16, between which are arranged channels 17, 18, 19. Each channel takes the product from a drain-plate evaporating surface and passes it down to the next drain plate for a more-uniform distribution (film) of liquid on each drain plate. Arranged on the inner wall of container 1, moreover, are throttle elements 21 in the form of inwardly-projecting pieces of sheet metal. These produce throttle locations between condensers 9 for a plurality of distilling stages with different pressures decreasing in the downward direction. In place of, or in addition to, the throttle elements, it is also possible to provide a plurality of connections for vacuum pumps having different suction capacities. In addition to this, the pipes constituting the condensation surfaces 9 may be supplied, in groups, with coolant at suitable temperatures.

In the examples of FIGS. 1 to 3, only one drain-plate arrangement of evaporating surfaces 8 is provided in each vacuum vessel 1. Although this is not shown, a plurality of parallel evaporation surfaces may be arranged in a vacuum vessel with intervening condensation surfaces, thus providing a drastic increase in the total of available evaporating surfaces.

Another way of enlarging the evaporating surfaces is shown in the embodiment according to FIGS. 4 and 5. A total of three star-shaped, drain-plate evaporation surfaces 8 is accomodated in a cross-sectionally circular vacuum vessel 1. The distribution device 4 and residue collector 5 are adapted to this arrangement of drain plates. For the sake of clarity, only three drain plates are shown, but with optimal utilization of the interior of the vacuum-vessel, a substantially larger number of drain plates (e.g. twelve) may be accomodated therein in the form of a star.

With a star-shaped configuration of drain plates, condensation surfaces 22 are preferably V-shaped, so that each side of each V-shaped condensation element faces two sides of a drain plate. Individual condenser elements consist of V-shaped tubular sections 23, a vertically arranged distributor-tube 24 and collector-tube 25 arrangement being in the vicinity of the open ends thereof. A suitable choice of the inlet 26 at the bottom, and of the outlet 27 at the top, causes the temperature of the condensation surfaces to decrease from top to bottom. The remaining spaces 28 form substantially triangular ducts for the collection and removal of uncondensed residual gases.

Another desirable characteristic, to wit a downward slope of the sides of the V-shaped tubular sections 23, at an angle α of 3° to 75° and preferably 5° to 20°, may be gathered from FIG. 4. This ensures that the distillate flows away laterally and is collected in drainage channels (not shown separately). This prevents thick films of distillate on the condensation surfaces and the resulting impairment of heat transfer in the case of particularly tall condensation surfaces.

In all of the figures, the evaporating surfaces are shown diagrammatically in the form of plates, but they may, with advantage, comprise openings or guides for thorough mixing and/or uniform distribution of the liquid film. To this end, the said evaporating surfaces may also be meshed, for example they may be made of expanded metal. What is essential is that the film of liquid shall flow turbulently or quasi-turbulently.

While the distillation method according to the invention is being carried out in the apparatus described, the evaporation pressure in vacuum vessel 1 must be kept relatively low, preferably between 50 and 0.01 mbars and, more particularly, between 10 and 0.1 mbars. This ensures that any distillate fractions still present may be recovered with a large yield. At the same time, the low level of pressure has the advantage that evaporation of the film takes place with no boiling bubbles, i.e. without any danger of splashing. Should it be necessary, for technical reasons, to operate at the upper end of the pressure range, it is advisable to provide splash-guards at least sectionally.

We claim:

1. In a method for short-path distillation of a liquid in a vacuum, wherein the liquid flows for at least quasi-turbulant flow and along an evaporating surface from an inlet to an outlet for distillable fractions of the liquid to evaporate therefrom and condense onto a condensation surface arranged a short distance away, the improvement comprising:
   placing the liquid upon the evaporating surface at the inlet at a temperature such that the energy required for the evaporation of the distillable fractions therefrom is taken at least partially from the still-unevaporated fraction of the liquid thereon; and
   decreasing the temperatures of the condensation surface and, continually, the evaporation pressures from the inlet toward the outlet, the evaporation pressures being in the range of from about 10 to about 0.1 mgar.

2. The method as set forth in claim 1, and further comprising circulating the liquid from the outlet back to the inlet.

3. The method as set forth in claim 1, and further comprising heating the evaporating surface adjacent the outlet.

4. Apparatus for short-path distillation of a distillable fraction of a liquid, comprising:
   a vacuum chamber;
   an evaporation surface in the vacuum chamber from which the distillable fraction of the liquid can evaporate;
   a condensation surface in the vacuum chamber along and at a sufficiently short distance from the evaporation surface for the evaporated distillable fraction of the liquid to condense thereonto;
   inlet means for applying the liquid to the evaporation surface at a temperature such that the energy required for the evaporation is taken at least partially from the still-unevaporated fraction of the liquid on the evaporation surface;
   means designed for producing at least quasi-turbulent flow of the liquid along the evaporation surface away from the inlet means;
   means for decreasing the temperatures of the condensation surface away from the inlet means; and
   vacuum means for providing pressure in the vacuum chamber in the range of from about 10 to about 0.1 mbar and decreasing the same continually away from the inlet means.

5. The apparatus as set forth in claim 4, wherein the vacuum means for decreasing the pressures in the vacuum chamber away from the inlet means comprises connecting the vacuum means to the vacuum chamber near the portion of the evaporation surface most remote from the inlet means.

6. The apparatus as set forth in claim 5, wherein the vacuum means for decreasing the pressures in the vacuum chamber away from the inlet means further comprises a throttle element in the vacuum chamber.

7. The apparatus as set forth in claim 4, wherein the means for decreasing the temperatures of the condensation surface comprises means for supplying a cooling medium into the condensation surface flowing toward the inlet means.

8. The apparatus as set forth in claim 4, wherein the vacuum means for decreasing the pressure in the vacuum chamber away from the inlet means comprises means for providing the pressure to the vacuum chamber in this way.

9. The apparatus of claim 4, wherein the vacuum chamber is cylindrical, and further comprising plural evaporation surfaces arranged radially in the cylindrical vacuum chamber.

10. The apparatus as set forth in claim 9, wherein the condensation surface comprises V-shaped members between each pair of the radially-arranged evaporation surfaces.

11. The apparatus as set forth in claim 10, and further comprising outwardly inclined ribs on the V-shaped condensation surfaces.

12. The apparatus as set forth in claim 10, wherein the external angle (alpha) of the V-shaped condensation surfaces is in a range of from 5° to 75°.

13. The apparatus as set forth in claim 12, wherein the angle is from 5° to 20°.

14. The apparatus as set forth in claim 9, wherein the condensation surface comprises pipe sectors between each pair of radially-arranged evaporation surfaces.

15. The apparatus as set forth in claim 4, and further comprising outlet means for collecting the condensate on one end of the condensation surface.

* * * * *